United States Patent [19]

Maloon et al.

[11] Patent Number: 4,635,278

[45] Date of Patent: Jan. 6, 1987

[54] AUTOREGRESSIVE DIGITAL TELECOMMUNICATIONS SYSTEM

[75] Inventors: Richard A. Maloon, Amherst; Harvey C. Woodsum, Nashua, both of N.H.

[73] Assignee: Sanders Associates, Inc., Nashua, N.H.

[21] Appl. No.: 530,928

[22] Filed: Sep. 12, 1983

[51] Int. Cl.[4] .................. H04L 27/26; H04J 1/00; G06F 7/38

[52] U.S. Cl. ........................ 375/45; 375/62; 375/89; 364/725; 370/69.1

[58] Field of Search ............... 340/825.71, 825.74; 370/110.2, 110.3, 70, 21, 22, 23, 69.1; 375/89, 88, 62, 37, 45, 122, 44, 48, 22; 364/485, 726, 725

[56] References Cited

U.S. PATENT DOCUMENTS 3,146,307  8/1964  Renshaw .
3,437,932  4/1969  Malakoff .
3,881,097  4/1975  Lehmann et al. .................. 364/726
4,306,308  12/1981  Nossen ................................. 375/48

OTHER PUBLICATIONS

S. Kay and S. L. Marple, Jr., "Spectrum Analysis—A Modern Perspective," Proc. of I.E.E.E., vol. 69, No. 11, Nov., 1981.

Primary Examiner—Robert L. Griffin
Assistant Examiner—M. Huseman
Attorney, Agent, or Firm—Louis Etlinger; Stanton D. Weinstein

[57] ABSTRACT

In a digital communications system, one of two tones is selected for each bit, a first tone for a "0" and a second tone for a "1"; the tones are unique for each bit. The tones for all of the bits of a byte are sent simultaneously, in a burst or pulse. At the receiver, a parametric model-based spectrum analysis is performed to find the constituent frequencies which produced the composite spectrum. This spectrum analysis uses autoregressive parameter estimation techniques to determine the most likely combination of frequency components which would have generated the composite spectrum. The combination of frequency components so found is then decoded to yield the corresponding bit values represented by those frequencies. The use of autoregressive spectral analysis techniques to recover the frequency components in the composite signal provides both bandwidth compression (by virtue of increased resolution) and faster signalling rates in transmitting just such signals.

Two methods are known for deriving spectral information from coefficients obtained through autoregressive spectral analysis; correspondingly, two embodiments are shown herein, for exploiting the differing properties of each such method. One method derives only the frequencies of the spectral components, while the second method also provides the pulse widths of the transmitted signals.

18 Claims, 5 Drawing Figures

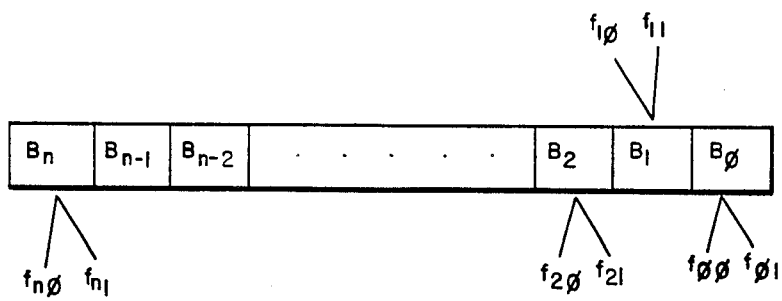
FIG. 2
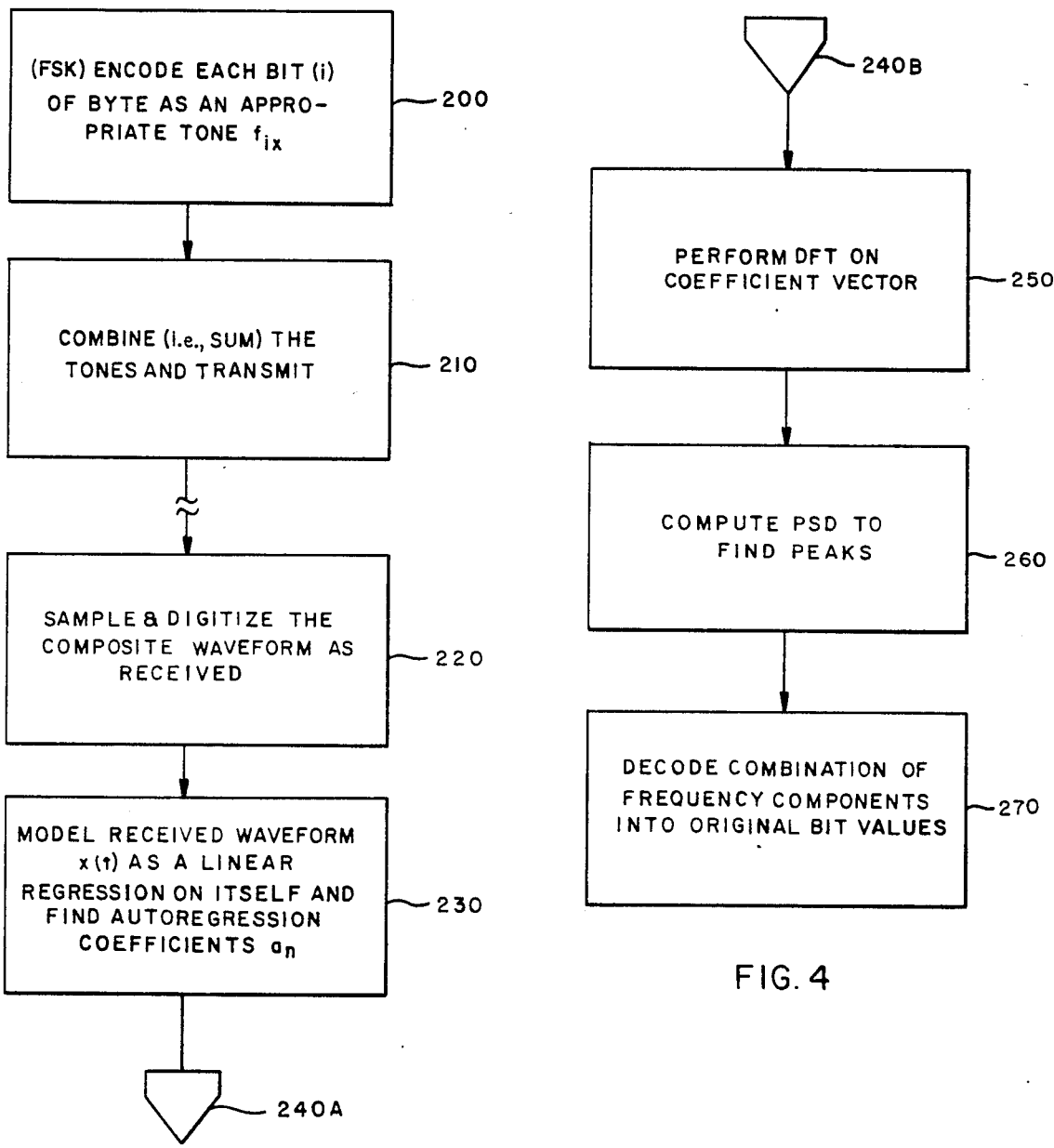
FIG. 3
FIG. 4

AUTOREGRESSIVE DIGITAL TELECOMMUNICATIONS SYSTEM

FIELD OF THE INVENTION

This invention relates to the field of digital communications and, more particularly, to a digital communications system which transmits simultaneously at multiple frequencies and which employs autoregressive spectrum analysis techniques for recovery (i.e., estimation) of the frequencies or other parameters of the transmitted signals.

BACKGROUND OF THE INVENTION

In digital communications, many techniques heretofore have been employed for transmitting information from one place to another. In all of these techniques, a physical communications channel is used to connect the sending site with the receiving site. This channel may include a wire or cable, or it may involve a wireless, radio frequency atmospheric transmission path. In either case, the physical characteristics of the channel and of the equipment required for transmission and reception impose bandwidth limitations on the signals used for information transmission and on the transmission rates.

For example, two typical modulation techniques are pulse code modulation (PCM) and frequency-shift keying (FSK). With PCM, a digital word is encoded as a series of distinct pulses; it requires a bandwidth proportional to the sampling interval, since this determines a limit on the frequency content of the signal. With FSK, the modulating signal causes the instantaneous frequency of the output signal to switch between preselected values, without phase discontinuity; FSK requires a transmission bandwidth inversely proportional to the duration (i.e., epoch). When these bandwidth constraints are violated, the spectrum of the waveform at the output of the channel differs from the spectrum of the transmitted signal. Consequently, the information transmission rate (which depends on the sampling interval or tone duration) is limited by the available bandwidth. The bandwidth constraints may be violated, for example, by transmitting faster than the channel capacity will permit or by failing to adapt to changes in channel characteristics. With atmospheric channels, in particular, these constraints can become complicated to deal with since atmospheric transmissivity is a function of time as well as frequency.

When FSK and similar techniques are employed, one tone is sent at a time. Information may be sent bit-by-bit or in groupings of bits. The former possibility requires the use of only two possible tones for sending the data—a first tone for a "1" and a second tone for a "0" or, alternatively, the first tone to indicate that the bit values are unchanged and a second tone to indicate when there is a change of bit values (zero to one or one to zero). The second possibility, referred to as M-ary FSK, involves the use of M different signalling frequencies, one for each of M different message values. To decode a transmitted FSK signal, the receiver determines which of the possible signal frequencies is present in the received signal at each given moment; from the frequency content, it can regenerate the originating message element. Either way, the channel bandwidth places a lower bound on the required duration of the tonals.

One way to increase the amount of information which can be sent in a given time is to transmit more than one bit at a time, using frequency division multiplexing (FDM) techniques. According to FDM, each signal to be transmitted is assigned to a definite frequency or range of frequencies separated sufficiently from each other so that at the receiving station they may be distinguished as separate signals. FDM and FSK can be combined, with FSK being used to transmit each of the signals is the FDM system. Thus, N bits can be sent simultaneously, one in each of N frequency bands, or channels. With conventional techniques, this requires a channel whose bandwidth is at least as wide as the sum of the bandwidths of the N bands, often with some margin for channel spacing, as well.

SUMMARY OF THE INVENTION

In the present invention, the throughput (i.e., signalling rate) is increased by sending all bits of each byte in parallel (i.e., at the same time), as in an FDM system such as has been described above. However, bandwidth is considerably reduced and the signalling rate may, at the same time, be increased.

As in a conventional FSK system, two tones are selected for each bit, a first tone for a "0" and a second tone for a "1." The appropriate combination of tones for the bits of each byte are sent simultaneously, in a burst. That is, for transmitting a message formed of a sequence of N-bit bytes, N tones (i.e., frequencies) are employed for each byte, from among the 2N possible tones. Each of these frequencies is unique. At the receiver, a spectrum analysis is then performed to find the constituent frequencies which produced the composite spectrum. A particular type of spectrum analysis is employed, termed parametric model-based spectrum analysis; it uses parameter estimation techniques to determine the most likely combination of frequency components which would have generated the composite spectrum. The combination of frequency components so found is then decoded to yield the corresponding bit values represented by those frequencies.

Conventional spectrum analysis would employ a fast Fourier transform (FFT) to calculate the spectral components of the composite waveform. The FFT approach, though suffers from certain inherent performance limitations. First, it has limited ability to resolve (i.e., distinguish) the spectral responses of two or more closely spaced signals; the frequency resolution (in hertz) is roughly the reciprocal of the time interval (in seconds) over which the sampled data is available. Thus, FSK tonals are unresolvable by an FFT implemented at the receiving end unless the record length (i.e., the duration of the tones) is longer than the reciprocal of their frequency difference. A second limitation arises from the implicit windowing of the data which occurs when processing with a FFT. This "windowing" manifests itself as "leakage" in the frequency domain; that is, energy in the main lobe of a spectral response "leaks" or is spread into side lobes, thereby distorting the spectral response and possibly obscuring other responses which may be present at those frequencies. These performance limitations are particularly troublesome when analyzing short data records.

To overcome, to a significant extent, the foregoing limitations of the FFT approach, the spectral analysis performed herein uses parametric signal modelling techniques rather than a FFT. Numerous algorithms are known in the art for performing spectral analysis by parametric signal modelling. A number of such parametric signal modelling techniques have been proposed in recent years, for use in spectral estimation. Some of these approaches are summarized in S. Kay and S. L. Marple, Jr., "Spectrum Analysis—A Modern Perspective," *Proc. of the Inst. of Elec. and Electronic Engrs.*, Vol. 69, No. 11, November 1981, at 1380. Such spectral estimation techniques are referred to by various names, such as autoregressive estimation, autoregressive spectral analysis, autoregressive power spectral density (PSD) estimation, moving average estimation, autoregressive moving average estimation, Pisarenko harmonic decomposition, Prony energy spectral density estimation, Prony spectral line estimation estimation, and others. Heretofore, these parametric signal modelling techniques have not been used to provide bandwidth compression in a digital communications system or to resolve the spectrum of a man-made source, particularly a digital source (i.e., a source using discrete frequencies). In the present invention, however, the use of autoregressive spectral analysis techniques to recover the frequency components in the composite signal provides both bandwidth compression and faster signalling rates in transmitting digital signals. For a typical telephone-based system, calculations indicate that with reasonable assumptions of signal-to-noise ratio, the bit transmission rate can be between two and three times as great as would be permitted by conventional (i.e., phase lock loop and fast Fourier transform) techniques and bandwidth may be reduced by a similar amount.

Two methods are known for deriving spectral information from coefficients obtained through autoregressive spectral analysis; correspondingly, two embodiments are shown herein, for exploiting the differing properties of each such method. One method derives only the frequencies of the spectral components, while the second method also provides the pulsewidths of the transmitted signals.

This invention is pointed out with particularity in the appended claims. A more thorough understanding of the above and further objects and advantages of this invention may be obtained by referring to the following detailed description, which should be read in conjunction with the accompanying drawings.

BRIEF DESCRIPTION OF THE DRAWING

FIG. 2 is a diagrammatic illustration of the correspondence between each bit of an N-bit byte and the signalling frequencies used in the present invention;

FIG. 3 is an illustration of the steps of the communications signalling process implemented by the apparatus of FIG. 1 up to the point of finding the autoregression coefficients;

FIG. 4 is an illustration of a first set of steps which may follow the procedure of FIG. 3 for deriving spectral information from the autoregression coefficients.

DESCRIPTION AN ILLUSTRATIVE EMBODIMENT

Figure 1:
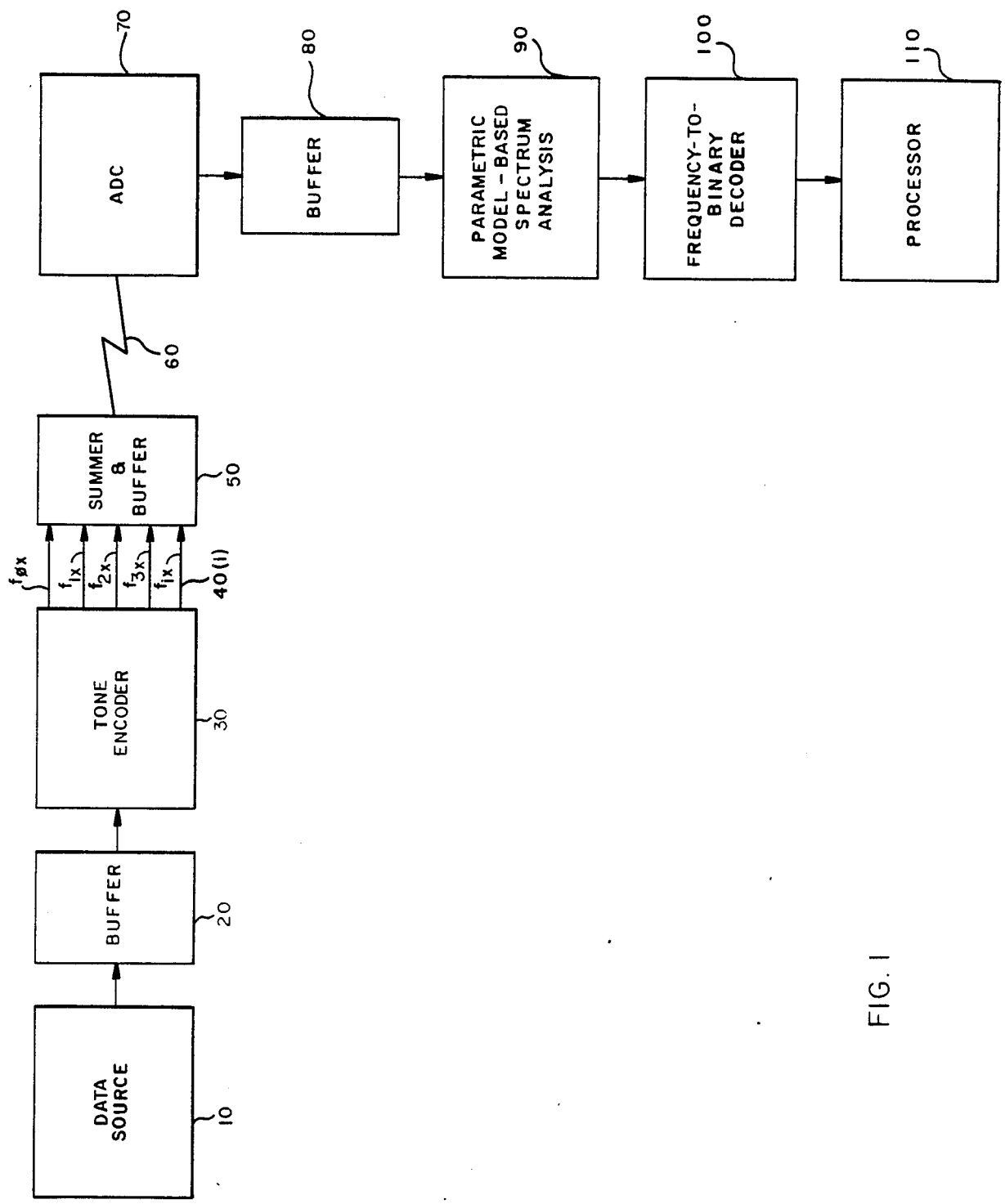
FIG. 1 is a block diagram of a basic communication system employing the present invention.

A block diagram of a basic communication system employing the present invention is shown in FIG. 1; it will be explained in conjunction with FIG. 2, which illustrates the correspondence between a single N-bit byte and the signalling frequencies. A data source 10, which forms no part of the invention, supplies to a buffer 20 a message to be transmitted. The message is formed of a sequence of one or more bytes. Each byte is provided in bit serial or parallel form. A tone encoder 30 responds to each byte supplied by a buffer 20 to generate a tone for each bit in the byte. If FSK (i.e., frequency-shift keying) modulation is employed, then each bit may be transmitted as one of two frequencies, a first frequency for a "zero" value and a second frequency for a "one" value. This arrangement is shown in FIG. 2. As illustrated there, each bit $B_i$ may be encoded as a pulse of frequency $f_{i0}$ if the value of the bit is 0 and as a pulse of frequency $f_{i1}$ if the value of the bit is 1. The tones are provided by the tone encoder 30, with one tone $f_{ix}$ (where x may be 0 or 1) on each of the corresponding output lines 40(i) (where i equals 1 through N). A summing and buffering stage 50 combines the various tones to provide a composite output waveform onto the channel 60.

At the receiving site, the received version of the composite signal is first processed by an analog-to-digital converter (ADC) 70. The output of ADC 70 is supplied to a buffer 80 which temporarily stores digitized samples of the received waveform. Then the digitized version of the received signal is processed by a parametric model-based spectrum analysis operation which is performed by block 90. It will be understood, of course, that the parametric model-based spectrum analysis operation is implemented using any suitable data processor, such as any of a large number of available microprocessors, appropriately programmed for spectral analysis. The spectral analysis ascertains the frequencies (i.e., tones) which were present in the composite received signal. This information is supplied to a decoder 100 which converts the frequency information to the original binary number which generated those tones. A processor 110, which forms no part of the invention, can then utilize the data.

Figure 5:
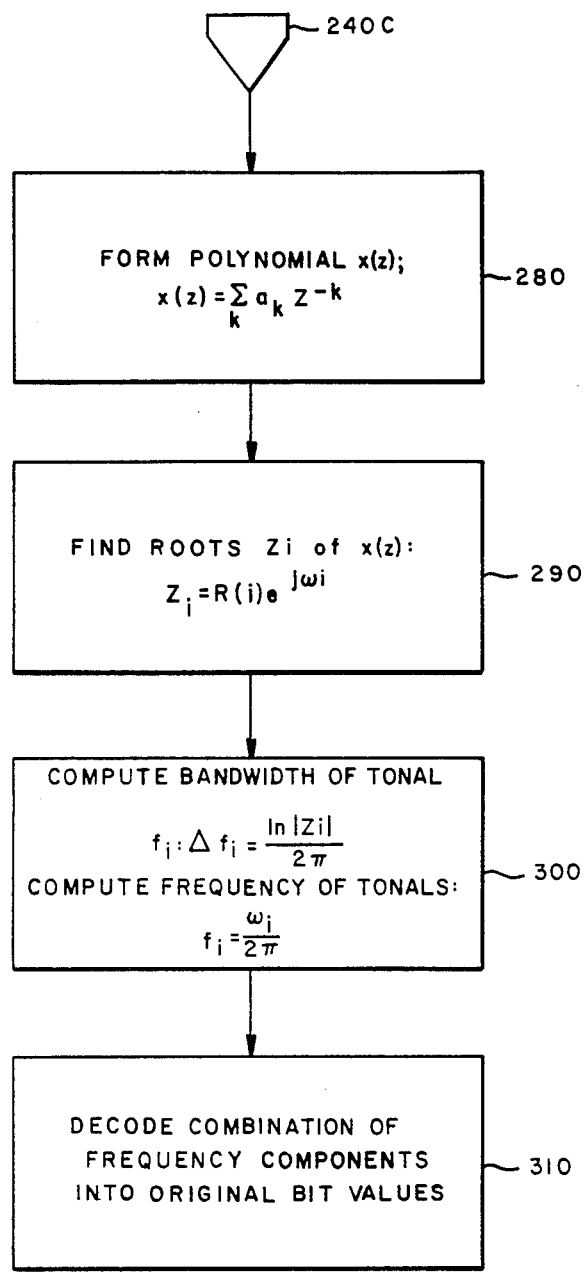
FIG. 5 is an illustration of a second set of steps which may follow the procedure of FIG. 3 for deriving spectral information from the autoregression coefficients.

FIG. 3 illustrates the process implemented by the apparatus of FIG. 1. The actual transmission process starts in step 200 with the encoding, using FSK techniques, of each bit of a byte; two unique tones are made available for each bit, one for the bit value 0 and the other for the bit value 1. All bits are encoded at the same time. The tonals thus generated are then combined (i.e., summed together) and transmitted as a unified, or composite, waveform. Step 210. At the receiver, the received version of the composite waveform is repetitively sampled and digitized. Step 220. The received signal x(t) is then modelled as a linear regression on itself:

$$x(t) = \sum_{n=1}^{P} x(t - n\Delta t)a_n + e(n\Delta t)$$

where p is the number of samples taken of received signal x(t), which is also equal to the model order, that is the number of frequencies which are to be determined, $\Delta t$ indicates the spacing between samples, and $e(n\Delta t)$ represents the error in the model, and the autoregression (AR) coefficients $a_n$ are first obtained from some algorithm, such as the Yule-Walker methods, solving $$R(i) = -\sum_{k=1}^{P} R(i-k)a_k$$

where R(i) denotes the autocorrelation function of x(t). Step 230. Two basic approaches exist for deriving spectral information about a signal from the autoregression coefficients. These two approaches are illustrated in FIGS. 4 and 5, respectively. The diagram of FIG. 3 connects at point 240A either to point 240B of FIG. 4 or to point 240C of FIG. 5, according to the approach selected.

In the first method (FIG. 4), a discrete Fourier transform (DFT) is performed on the normalized coefficient vector $(1, a_1, a_2, a_3, \ldots, a_{p-1})$:

$$x(k) = \sum_{i=0}^{N} a_i e^{j2\pi ik/N}$$

where N is the number of discrete frequencies at which the DFT is calculated, which corresponds to the model order p. Step 250. The power spectral density (PSD) at the frequency $k = f_s/N$ (where $f_s$ is the sample frequency) is then obtained from $$PSD(k) = \frac{1}{|x(k)|^2}$$

Step 260. The spectral peaks of the PSD reveal those frequencies where tones are present. Finally, the computed frequency combination is decoded into the corresponding bit values and the bit values are reassembled into a byte, with each bit in its proper place in the byte.

The second method starts with the formation of a polynomial x(z) from the AR coefficients $a_k$:

$$x(z) = \sum_{l}^{P} a_k z^{-k}$$

Step 280. The roots $z_i$ of this polynomial are found from the relationship $$Z_i = R(i)e^{jw}$$

(Step 290) and contain information about the pulse width (i.e., duration) of the tonals and about the frequencies which are present. The information about pulse width is contained in R(i), which is the magnitude of $z_i$. The frequencies present are indicated by $\omega_i$. And the bandwidth $\Delta f_i$ of a signal corresponding to a given root $z_i$ is $$\Delta f_i = \frac{\ln|Z_i|}{2\pi}$$

in units of the sampling frequency, $f_s$, and the frequency $f_i$ corresponding to a given root $z_i$ is:

$$f_i = \frac{\omega_i}{2\pi}$$

(Step 300). Finally, the computed frequency combination is decoded into the corresponding bit values and the bit values are reassembled into a byte, with each bit in its proper place in the byte. Step 310. The signal bandwidth provides a second independent variable which can be used to convey data; by using pulse width modulation (PWM), the bandwidths of the transmitted signals may be varied and these variations may be detected using the foregoing procedure.

Though it is not yet known precisely how much of an improvement the present invention represents over the use of a FFT, calculations indicate that the resolution improvement factor (RIF) is given approximately by the following formula:

$$RIF = 0.4175[((SNR)(N/2+1))]^{0.31}$$

where SNR is the voltage signal-to-noise ratio and N signifies the number of samples per epoch. For a typical telephone-based system, the following parameter values may be used: SNR=33 dB in a 200 Hz band, with N=10 for a 1000 Hz tone and samples taken at the rate of 2000 per second. This works out to RIF=2.36.

Having thus described exemplary embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed as new and desired to be secured by Letters Patent of the United States is:

1. A digital communication systems for transmitting bytes of information from a data source to a destination, each byte having N bits of information, the system comprising:

A. means for encoding each bit as a tone pulse, the frequency of each tone pulse being selected from among a set of predetermined frequencies each of which corresponds uniquely to the logical value of a predetermined one of said N bits within a byte;

B. means for sending to the destination, via a communications channel, the tone pulses for all of the bits of a byte simultaneously, such that a composite waveform is formed thereby;

C. at the destination, means for providing digital samples of a received version of the composite waveform;

D. means for performing a parametric model-based spectrum analysis on the received version of the composite waveform from the digital samples thereof, for determining the tonal components present therein; and E. means for decoding said tonal components to provide a reconstruction of the N-bit byte from which the composite waveform was generated.

2. The digital communications system of claim 1 wherein the means for performing parametric model-based spectrum analysis further comprises means for autoregressive power spectral density estimation for determining the tonal components present in the received version of the composite spectrum by calculating the coefficients representing the autocorrelation function of the received composite waveform.

3. The apparatus of claim 2 wherein the parametric model-based spectrum analysis means further comprises:

F. means for modelling the received version of the composite waveform, denoted x(t), as a linear regression on itself; and G. means for determining a set of k autoregression coefficients which describe x(t).

4. The apparatus of claim 3 wherein the parametric model-based spectrum analysis means further comprises:

H. means for generating a discrete Fourier transform (DFT) of a vector formed of the autoregression coefficients; and
I. means for computing the power spectral density of said DFT to identify the spectral peaks therein, said spectral peaks occurring at the frequencies of the tonal components of the composite waveform.

5. The apparatus of claim 3 wherein the parametric model-based spectrum analysis means further comprises:

J. means for forming a polynomial x(z) from the autoregression coefficients $a_k$ such that $$x(z) = \sum_{k=1}^{P} a_k z^{-k}$$

K. means for finding the roots $z_i$ of x(z) from the relationship $$Z_i = R(i)e^{j\omega i}, i=1 \text{ to } p$$

where R(i) is the autocorrelation function; and
L. means for determining the frequency of each of the tonal components of the composite waveform from the relationship $$f_i = \frac{\omega_i}{2\pi}$$

6. The apparatus of claim 5 wherein the parametric model-based spectrum analysis means further comprises:

M. means for determining the bandwidth $\Delta f_i$ of a tonal component at frequency $f_i$ from the relationship $$\Delta f_i = \frac{\ln |Z_i|}{2\pi}$$

7. A frequency division multiple access digital communications system, of the type wherein a transmitter transmits at any given instant a plurality, N, of tone frequencies, out of a possible M, where M is greater than N, and a receiver receives the same plurality of N tone frequencies simultaneously as a composite signal, and said receiver also provides digital samples of the composite signal, the improvement comprising:

means for performing a parametric model-based spectrum analysis on said samples of the composite signal, thereby determining which N of M frequencies were transmitted at a particular instant.

8. A pulse width modulation digital communications system, of the type wherein a transmitter transmits at any given instant at least one tone pulse of a particular frequency and time duration, which is one of M possible preselected frequencies and tone durations, and a receiver receives at least one tone pulse and provides digital samples of same, the improvement comprising:

means for performing a parametric model-based spectrum analysis on said received digital samples, thereby determining the time duration of each of the at least one tone pulses.

9. A method for decoding a frequency division multiplexed communications signal, this communications signal of the type wherein at a given instant in time a plurality, N, of a possible M, where M is greater than N, tone frequencies are present, the method comprising the steps of:

(1) sampling the communications signal with an analog to digital converter thereby providing a digitized received signal;
(2) modelling the digitized received signal as a linear regression on itself, thereby providing a set of K autocorrelation coefficients $a_n$, where K is equal to or greater than N; and
(3) deriving a set of N frequency values, $f_i$, from the set of K autocorrelation coefficients, thereby obtaining which N of M tone frequencies are present in the communications signal at the given instant.

10. A method as in claim 9 wherein the step (3) of deriving a set of N frequency values further comprises the steps of:

(i) performing a discrete Fourier transform on the set of coefficients $a_n$, thereby providing a set of transformed coefficients;
(ii) calculating a power spectral density from the set of transformed coefficients; and
(iii) determining the N largest peaks of the power spectral density, the frequency of the N largest peaks thereby indicating which N of M tone frequencies are present in the communications signal at the given instant.

11. A method as in claim 9 wherein the step (3) of deriving a set of N frequency values further comprises the steps of:

(i) forming a representation for a polynomial x(z), from the set of coefficients $a_n$, in the form $$x(z) = \sum_{k=1}^{P} a_k z^{-k}$$

(ii) finding N roots, $z_i$, of the polynomial x(z) from the relationship $$Z(i) = R(i)e^{j\omega i}, i=1 \text{ to } p$$

where R(i) denotes the autocorrelation function of the digitized received signal; and
(iii) determining which N of M tone frequencies are present in the communications signal from the angle portion, $\omega_i$, of the N roots $z_i$, by using the relationship $$f_i = \frac{\omega_i}{2\pi}$$

12. A method as in claim 11 wherein the time duration of a given tone frequency varies, and further comprising, after step (iii), the step:

(iv) determining a bandwidth $\Delta f_i$ of the N tone frequencies from the magnitude portion of the N roots $Z_i$, by using the relationship $$\Delta f_i = \frac{\ln |Z_i|}{2\pi}$$

13. A method for digitally transmitting bytes of information from a data source to a destination, each byte having N bits of information, the method comprising the steps of:
- A. encoding each bit as a tone pulse, the frequency of each tone pulse being selected from among a set of predetermined frequencies, each of which corresponds uniquely to the logical value of a predetermined one of said N bits within a byte;
- B. sending to the destination, via a communications channel, the tone pulses for all of the bits of a byte simultaneously, such that a composite waveform is formed thereby;
- C. at the destination, providing digital samples of a received version of the composite waveform;
- D. performing a parametric model-based spectrum analysis on the received version of the composite waveform from the digital samples thereof, for determining the tonal components present therein; and
- E. decoding said tonal components to provide a reconstruction of the N bit byte from which the composite waveform was generated.

14. The method of claim 13 wherein the step of performing a parametric model-based spectrum analysis further comprises:
performing an autoregressive power spectral density estimation for determining the tonal components present in the received version of the composite spectrum, by calculating the coefficients representing the autocorrelation function of the received composite waveform.

15. The method of claim 13 wherein the step of performing a parametric model-based spectrum analysis further comprises the steps of:
- F. modelling the received version of the composite waveform, denoted x(t), as a linear regression on itself; and
- G. determining a set of K autoregression coefficients which describe x(t).

16. The method of claim 15 wherein the step of performing a parametric model-based spectrum analysis further comprises the steps of:
- H. generating a discrete Fourier transform (DFT) of a vector formed of the autoregression coefficients; and
- I. computing the power spectral density of said DFT to identify the spectral peaks therein, said spectral peaks occurring at the frequencies of the tonal components of the composite waveform.

17. The method of claim 15 wherein the step of performing a parametric model-based spectrum analysis further comprises the steps of:
- J. forming a polynomial x(z) from the autoregression coefficients $a_k$ such that $$x(z) = \sum_{k=1}^{P} a_k z^{-k}$$

- K. finding the roots $z_i$ of x(z) from the relationship $$Z_i = R(i)e^{j\omega i}, i=1 \text{ to } p$$

where R(i) is the autocorrelation function of x(z); and
- L. determining the frequency of each of the tonal components of the composite waveform from the relationship $$f_i = \frac{\omega_i}{2\pi}$$

18. The method of claim 17 wherein the step of performing a parametric model-based spectrum analysis further comprises the step of:
- M. determining the bandwidth $\Delta f_i$ of a tonal component at frequency $f_i$ from the relationship $$\Delta f_i = \frac{\ln|Z_i|}{2\pi}$$

* * * * *